(12) United States Patent
O'Connor et al.

(10) Patent No.: US 9,002,530 B2
(45) Date of Patent: Apr. 7, 2015

(54) POWER PLANT OPERATION ENHANCEMENT

(75) Inventors: Michael James O'Connor, Simpsonville, SC (US); Scott Francis Johnson, Simpsonville, SC (US); Mark Stewart Schroder, Greenville, SC (US)

(73) Assignee: General Electric Company, Schenectady, NY (US)

( * ) Notice: Subject to any disclaimer, the term of this patent is extended or adjusted under 35 U.S.C. 154(b) by 453 days.

(21) Appl. No.: 13/453,713

(22) Filed: Apr. 23, 2012

(65) Prior Publication Data

US 2013/0282195 A1 Oct. 24, 2013

(51) Int. Cl.
*G05D 11/00* (2006.01)
*F01K 13/02* (2006.01)

(52) U.S. Cl.
CPC ....................................... *F01K 13/02* (2013.01)

(58) Field of Classification Search
USPC ............................... 700/291; 600/773; 429/61
See application file for complete search history.

(56) References Cited

U.S. PATENT DOCUMENTS

| | | | |
|---|---|---|---|
| 6,823,675 B2 | 11/2004 | Brunell et al. | |
| 7,356,383 B2 | 4/2008 | Pechtl et al. | |
| 2004/0123600 A1* | 7/2004 | Brunell et al. | 60/773 |
| 2005/0158614 A1* | 7/2005 | Hennessy | 429/61 |
| 2006/0178782 A1* | 8/2006 | Pechtl et al. | 700/286 |
| 2011/0037276 A1* | 2/2011 | Hoffmann et al. | 290/40 C |

* cited by examiner

*Primary Examiner* — Robert Fennema
*Assistant Examiner* — Anthony Whittington
(74) *Attorney, Agent, or Firm* — Ernest G. Cusick; Hoffman Warnick LLC

(57) ABSTRACT

A power plant control system determines an augmented operating parameter set point responsive to a life cycle cost (LCC) objective function responsive to a LCC model. The augmented operating parameter value may be responsive to an initial set point determined by a controls model and a performance indicator determined by a performance model. The power plant may include a thermal generator, such as a gas turbine or other fuel-burning generator, and the operating parameter may include firing temperature, fuel flow rate, steam pressure/temperature/flow rate, and/or another suitable operating parameter. An offer curve is generated responsive to the augmented operating parameter.

19 Claims, 5 Drawing Sheets

POWER PLANT OPERATION ENHANCEMENT

BACKGROUND OF THE INVENTION

The disclosure relates generally to power generation, and more particularly to optimization of power generation in a power plant that includes a thermal generator, such as a gas turbine.

In power generation, it is common to use thermal generators, such as gas turbines and combined cycle power plants, to generate electricity in a power system. Such a power plant typically includes a power plant control system that may generate an offer curve or a set of offer curves representing cost of power production by the power plant. For example, an offer curve may include an incremental variable cost curve, an average variable cost curve, or another suitable indication of power generation cost, typically measured and/or expressed in dollars per megawatt-hour versus power plant output in megawatts.

As is known, an average variable cost curve may represent a cumulative cost divided by a cumulative power output for a given point, and an incremental variable cost curve may represent a change in cost divided by a change in power output for a given point. An incremental variable cost curve may be obtained, for example, by taking a first derivative of an input-output curve of the power plant that may represent cost per hour C versus power generated $P_g$. In other words, if cost per hour is represented by $$C=RK,$$

R=fuel rate, K=fuel cost,
then incremental cost IC may be represented by:

$$IC = \frac{dC}{dP_g} = K\left(\frac{dR}{dP_g}\right)$$

In a combined cycle power plant in which waste heat from a fuel burning generator is used to produce steam to power a supplemental steam turbine, an incremental variable cost curve may also be obtained with known techniques, but its derivation may be more complex.

The power plant control system may send the offer curve(s) to a power system controller of an authority, such as an independent system operator in a deregulated market or a utility company in a regulated market, and may do so periodically. For example, some power plant control systems send an offer curve daily, and some even send the same, predefined offer curve every time, not taking unit degradation or changing ambient and/or market conditions into account.

The power system controller may receive offer curves from other power plants under its control and evaluate all offer curve(s) received to determine which power plants should be engaged and for how much power, such as by generating a unit commitment and/or dispatch schedule. Generation of a unit commitment and/or dispatch schedule typically includes consideration of a future time period or prediction horizon. While the future time period has typically been on the order of one or more days, more recent systems consider smaller time periods, such as an hour or fifteen minutes, so that power system control approaches real time control.

The power system controller generates the unit commitment and/or dispatch schedule and sends or communicates the control signals to the power plants. These control signals may include a target load for a respective power plant. Each power plant control system may then determine an appropriate set point for an operating parameter such that it can meet the target load, and each power plant control system may include its own optimization routines to optimize power plant operation. However, such optimization routines do not take life cycle cost of the power plant into account, particularly in generating an offer curve.

In general, gas turbine life, for example, may be measured in hours of operation and/or number of starts from an initial time of readiness for operation. If a gas turbine or a part of a gas turbine reaches its starts limit before its hours limit, it must be repaired or replaced, even if it has hours-based life remaining. Hours-based life in a gas turbine may be prolonged by reducing firing temperature, but this reduces efficiency of the gas turbine, increasing cost of operation. Conversely, increasing the firing temperature increases efficiency, but shortens gas turbine life and may increase maintenance and/or replacement costs. Thus, life cycle cost may be affected by changing the manner in which a power plant is operated.

BRIEF DESCRIPTION OF THE INVENTION

Embodiments of the invention disclosed herein may take the form of a power plant life cycle cost enhancing system for a power plant. The power plant may be arranged to generate electricity by burning fuel and may be operationally coupled to a power plant control system including a computing device. The computing device may be configured to monitor a first parameter of the power plant and to receive a target load representing a desired power output of the power plant. A first model of the power plant may be employed to simulate operation of the power plant and to determine at least a performance indicator of the power plant, an initial set point for an operating parameter of the power plant, and an estimated life cycle cost of the power plant responsive to at least the monitored parameter of the power plant. The operating parameter may then be augmented using the output of the first model responsive to a life cycle cost based objective function such that the life cycle cost based objective function is solved for reduced life cycle cost, thereby producing an augmented set point for the operating parameter. At least one offer curve including a cost of power production versus power output of the power plant may be generated using the augmented set point.

Another embodiment may include a computer program product for enabling enhanced offer curve generation of a power plant by a power plant control system, the power plant control system including a computing device and a storage device arranged to store the computer program product, the computing device being configured to execute the computer program product, and the computer program product comprising instructions in the form of computer executable program code that configures the power plant control system when executed. The power plant control system may be configured to generate an offer curve of the power plant, the offer curve representing an estimated cost of operation versus power output of the power plant. The generation of the offer curve may be responsive to an augmented value of an operating parameter of the power plant based at least in part on solution of a power plant optimization problem including a life cycle cost based objective function for the power plant. The life cycle cost based objective function may be responsive to at least a life cycle cost model of the power plant and an initial set point of the operating parameter.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

As indicated above, aspects of the invention provide a method of power plant control that balances performance with life cycle cost, particularly for a power plant including a thermal generator. For example, a minimum variable operating cost that may be achieved for a unit whose life is measured in hours of operation, operating in hours-based maintenance, may be a balance between variable fuel cost (i.e., efficiency) and life-cycle cost (i.e., variable operation and maintenance) and a function of market conditions. By varying a parameter of a thermal generator of a power plant taking such factors into account, more economical advantage may be taken of a power plant over its useful life. For power plants including gas turbines in particular, for example, firing temperature may be varied to provide a desired load level more economically based on operating profile, ambient conditions, market conditions, forecasts, power plant performance, and/or other factors. As a result, the disposal of parts with residual hours-based life remaining in starts-limited units may be reduced. Further, a feedback loop may be included in the power plant control system so that optimization is performed with as recent information as may be provided. Another feedback loop may be introduced between the power plant control system and the power system controller/dispatch controller so that target load and unit commitment may be based on offer curves that have been generated with as recent information as may be provided, including the target load itself. Embodiments of the invention additionally facilitate representation of a power plant's "true" cost structure for the purposes of ensuring the most competitive commitment and dispatch scheduling process, in many power markets.

Figure 1:
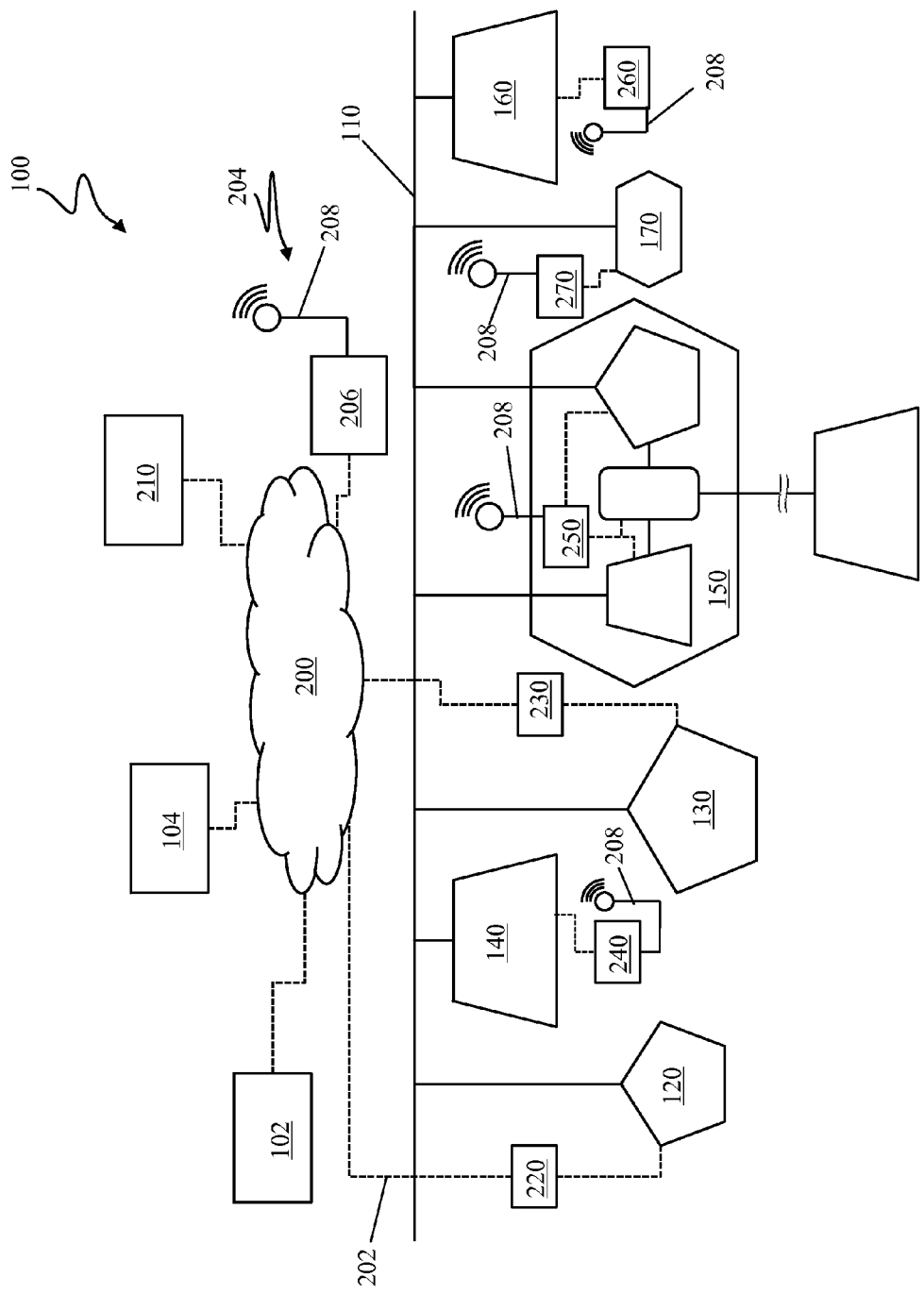
FIG. 1 shows a schematic diagram of a power system with which embodiments of the invention disclosed herein may be employed.

FIG. 1 shows an example of a power system 100 in which embodiments of the invention disclosed herein may be employed. In FIG. 1, power sources are represented by pentagonal blocks, loads/power users/consumers are represented by trapezoidal blocks, mixed function devices are represented by hexagonal blocks, and storage devices are represented by ovals. Transmission lines 110 may connect the various power sources/loads in power system 100. It should be understood that transmission lines 110 represent a distribution network for power system 100 and may include multiple sections/segments and/or substations as may be desired and/or appropriate.

Multiple power sources may be part of power system 100. For example, power system 100 may include a hydroelectric generator 120, and/or a fuel-burning, thermal, or combined cycle generator 130, such as a coal-fired power plant, a gas turbine power plant and/or a gas turbine/steam turbine combined cycle power plant. In addition, power system 100 may include additional power sources, such as solar power installations, wind turbines, and/or any other suitable and/or desired power source now known or discovered hereafter. Power produced by these power sources may be delivered via transmission lines 110 to loads, such as a municipality 140, a vehicle charging system 150, and/or commercial facility 160. In addition, a storage device 170 may draw power from transmission lines 110 to store power for use during power outages, excess demand, or other situations. It should be understood that municipality 140 may simply be a house in smaller scale embodiments, but may include a multiplicity of buildings from a neighborhood to an entire city. Similarly, commercial facility 160 may simply be a store or the like in smaller installations, but may include manufacturing plants or entire commercial districts. Likewise, storage device 170 may be a single battery, but may represent larger scale power storage systems.

Power system 100 may include control units or controllers, represented by rectangular blocks, connected via a communications system 200, which may include a wired network connection 202, a wireless network connection 204, and/or other forms of connections as may be suitable and/or desired. Wireless network connection(s) 204 may include a wireless access point 206 or other radio or light based communications device and an antenna 208 or the like connected to wireless access point 206 and any device in power system 100 wirelessly connected to communications system 200. In addition, communications system 200 may be connected to or part of a larger communications system or network (not shown), such as the internet or a private computer network.

A power system controller 210 of power system 100 may receive data from and issue instructions to local or device controllers, such as hydroelectric controller 220, fuel-burner controller 230, municipality controller 240, charging system controller 250, commercial facility controller 260, storage controller 270, and/or other controllers and/or sensors as may be distributed in power system 100. In addition, power system controller 210 may receive information from and/or send information to external sources through communications system 200, such as a meteorological/climate information source 102, a usage history information source 104, and/or other external sources as may be appropriate and/or desired. Each local controller may control various aspects of the system or device for which it is responsible and/or may relay information from the system or device to power system controller 210.

In embodiments, it may be convenient to use the terms prediction horizon, time interval, and prediction length. The prediction horizon, PredictionHorizon, is a predefined period of time over which optimization is to be performed. The time interval, TimeInterval, is a predefined time resolution of optimization, or how often optimization is to be performed during the prediction horizon. For example, a typical time interval may be from 6 to 15 minutes, though other time intervals may be employed. The prediction length, PredictionLength, is the number of time intervals for which optimization is to be performed and may be obtained by dividing PredictionHorizon by TimeInterval. Thus, for a 24-hour prediction horizon and a 12-minute time interval, a prediction length is 120 time intervals. A time step, t, may be used as an index in embodiments and may vary from 1 to the prediction length, where 1 is the present time step. To simplify implementation of embodiments, parameters may be expressed in terms of time step, time interval, and prediction length.

Figure 2:
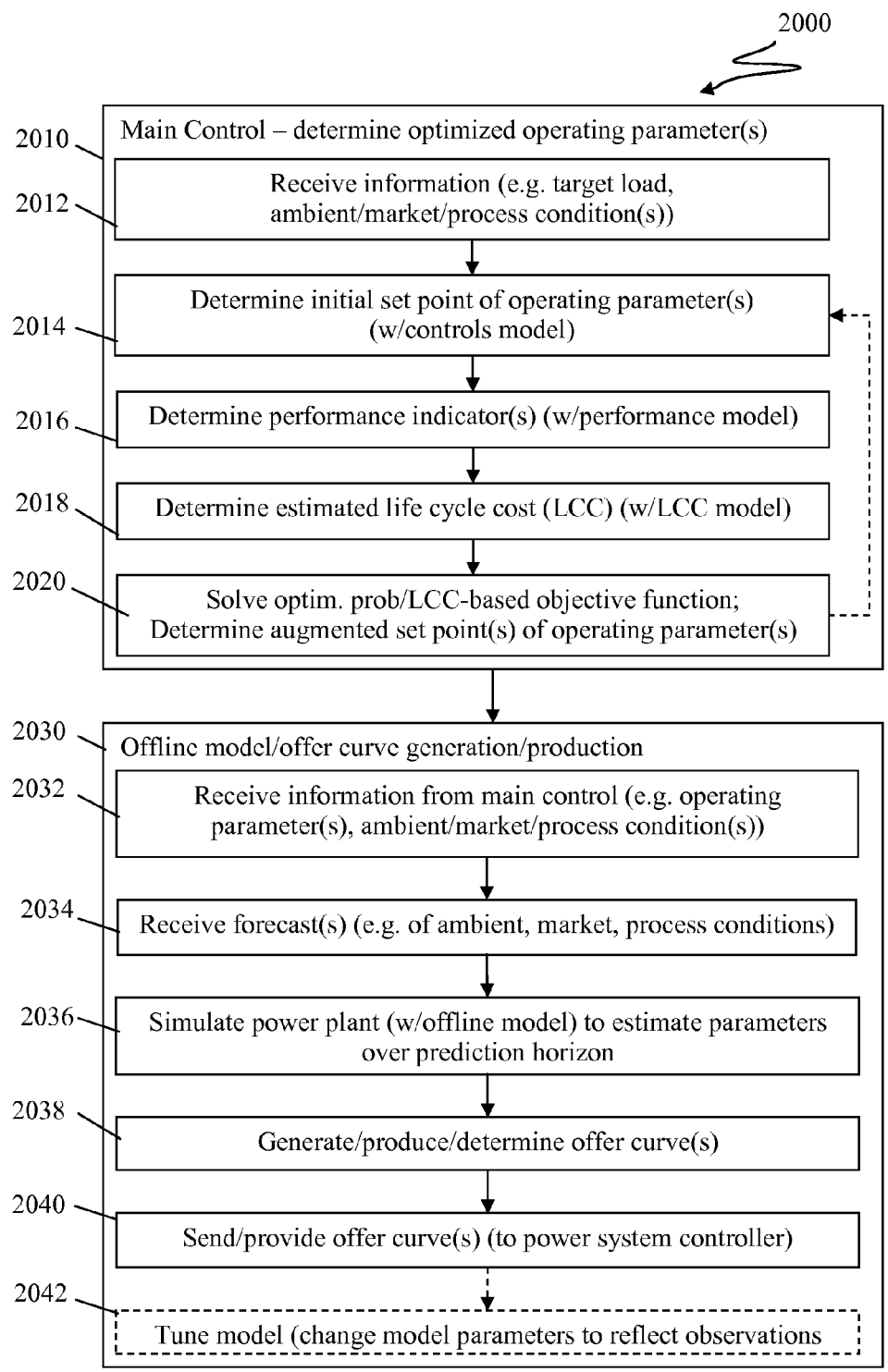
FIG. 2 shows a schematic diagram of a power plant control system according to embodiments of the invention disclosed herein.
Figure 3:
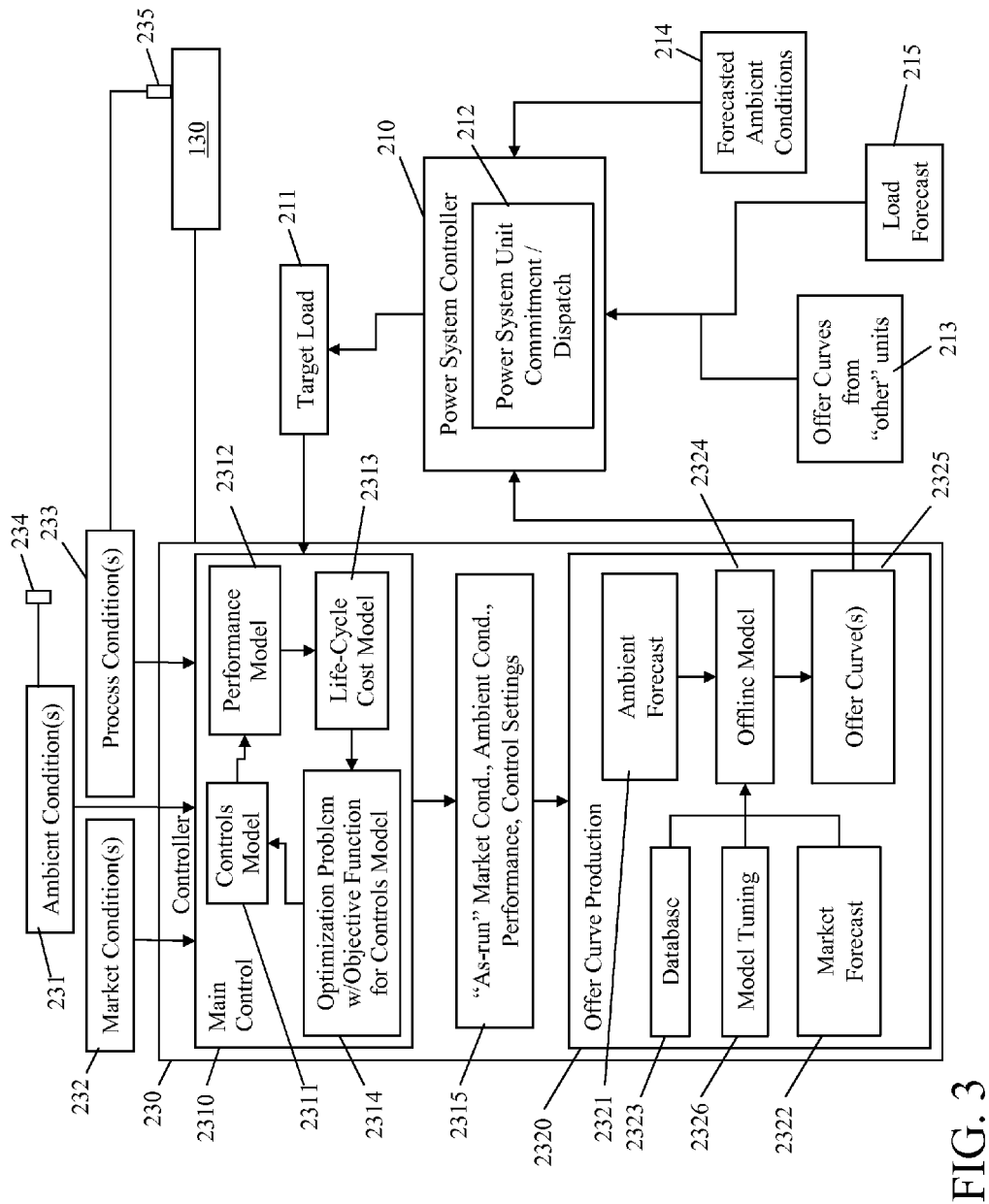
FIG. 3 shows a schematic flow diagram of a power plant control method according to embodiments of the invention disclosed herein.

Referring to FIGS. 2 and 3, embodiments of a method 2000 shown in FIG. 2 may be implemented in a power plant control system 230 of power plant 130, shown schematically in FIG. 3, which may take the form of a controller or other computing device(s) and may communicate with power system controller 210 as described above. The various blocks within power plant control system 230 are used to assist in description, are separated mostly by function, may not represent individual chips or processors or other individual hardware elements, and may or may not represent sections of computer program code executed by controller 230. Similarly, while method 2000 is broken into two major sections, this is for convenience and to assist with description. Any or all of the blocks shown in FIG. 2 may be combined into one or more sections, as may any or all of the blocks shown in controller 230 of FIG. 3.

Referring to FIGS. 2 and 3, embodiments of method 2000 may begin, for example, with a main control section 2010 which may receive or gather information to be used (block 2012), such as an ambient condition 231, a market condition 232, and/or a process condition 233. For example, power system controller 230 may be arranged to receive information to be used, such as by a main control module 2310, for use by various portions, elements, and/or processes of power plant system control system 230. A target load 211 may also be received, though on an initial run, such a target load may not be available, and a predefined initial target load may be used. It should be recognized that while ambient, market, and process conditions 231, 232, 233 are described as singular, multiple such conditions may be received and used by power plant control system 230.

Market condition 232 may be received from power system controller 210 or a source external to power system 100, though other sources may be used in embodiments. Ambient condition 231 may also be received from power system controller 210, but may instead be received from at least one ambient sensor 234 deployed around power plant 130, shown schematically in FIG. 3. In embodiments in which multiple ambient conditions 231 are used, a combination of sources may be employed so that one or more ambient conditions 231 may be received from power system controller 130 or another external source, while another one or more ambient conditions may be received from ambient sensor(s) 234. An ambient condition that might be used may include ambient temperature, relative humidity, air pressure, and/or another ambient condition as may be suitable and/or desired. Additionally, market condition 232 may include energy sale price, fuel cost, labor cost, and/or another condition related to an energy market in which power produced by power plant 130 might be sold.

A process condition 233 that may be directly measured in embodiments may be received from at least one process sensor 235 deployed on and/or in power plant 130, shown schematically in FIG. 3. A process condition 233 that may be used in embodiments may include, for example, temperature and/or pressure from a point within the power plant, actual power output of the power plant, and/or another process condition as may be desired and/or suitable. A process condition 233 that is difficult, impractical, or impossible to directly measure may be determined by power plant control system 230, as will be described.

As seen in FIG. 2, an initial set point of an operating parameter of power plant 130 may be determined, such as with a controls model 2311 implemented by power plant control system 230 (FIG. 3). Controls model 2311 may, for example, be a computer program or the like configured to use thermodynamic and/or physical details of power plant 130 and/or additional information, such as values of one or more ambient condition 231 and/or market condition 232 and/or process condition 233, to determine a value of an operating parameter of power plant 130 (block 2014 of FIG. 2), such as a value that would be required to achieve power output sufficient to meet a target load 211. The determined value may be used as an initial set point for the respective operating parameter of power plant 130 (also block 2014 of FIG. 2). An example of an operating parameter may include a fuel flow rate, a firing temperature $T_f$, a position for inlet guide vanes (if guide vanes are present), a steam pressure, a steam temperature, a steam flow rate, or another suitable operating parameter.

In embodiments, a performance indicator may be determined (block 2016 of FIG. 2), such as by using a performance model 2312 of power system control system 230 (FIG. 3) to determine a value of an operating characteristic of power plant 130. Performance model 2312 may be a computer program or the like that, in similar fashion to controls model 2311 above, may be configured to use thermodynamic and/or physical details of power plant 130, as well as the set point determined by controls model 2311, to determine a value of an operating characteristic of power plant 130. An example of an operating characteristic that might be determined by performance model 2312 is efficiency, though other suitable operating characteristics may be determined within the scope of embodiments. Performance model 2312 may be configured to take into account additional information, such as ambient condition 231, market condition 232, process condition 233, and/or other relevant information, and may take into account historical information and/or forecast information as well as current information.

In addition, an estimate may be determined of a life cycle cost (LCC) of power plant 130 (block 2018 of FIG. 2), such as with a LCC model 2313 that may be included in power plant control system 230 (FIG. 3). LCC model 2313 may be a computer program or the like configured to use physical and/or cost information about power plant 130, and may also use the set point from controls model 2311 and/or other information, to determine an estimated life cycle cost of power plant 130. Life cycle cost may include, for example, a total cost, a maintenance cost, and/or an operating cost of power plant 130 over its service life. LCC model 2313 may additionally be configured to take into account the results of performance model 2312 for enhanced accuracy. LLC model 2313 may therefore use the determined set point of controls model 2311 and the operating characteristic from performance model 2312, as well as other information, if desired, to estimate a service life of power plant 130 and/or components of power plant 130, and how much it may cost to operate and/or maintain power plant 130 during its service life. As noted above, service life of a power plant may be expressed in hours of operation and/or number of starts, and a given power plant has an expected service life that may be provided by a manufacturer of the power plant. Thus, predefined values of expected service life may be used at least as a starting point for LCC model 2313, and/or an enhancement module 2314.

Using information from other portions of embodiments of the invention, such as results from determining an initial set point, a performance indicator, and an estimated life cycle, an optimization problem may be solved for power plant 130 (block 2020) as described below. Such an optimization problem may include a plurality of equations in a plurality of variables, depending on a depth of analysis desired, and may include an objective function, which in embodiments may be a LCC-based objective function. The solution may include providing an enhanced or augmented operating parameter of power plant 130, such as, for example, by minimizing a LCC-based objective function (also block 2020). In embodiments, the solution of the optimization problem may be performed by an enhancement module 2314 of power plant control system 230 (FIG. 3).

As is known from optimization theory, an objective function represents a characteristic or parameter to be optimized and may take into account many variables and/or parameters, depending on the optimization problem to be solved. In an optimization problem, an objective function may be maximized or minimized, depending on the particular problem and/or characteristic and/or parameter the objective function represents. For example, as indicated above, an objective function expressing LCC according to embodiments would be minimized to produce at least one operating parameter that may be used to run power plant 130 so as to keep LCC as low as feasible. An optimization problem for power plant 130, or at least an objective function, may take into account such factors as power plant characteristics, site parameters, customer specifications, results from controls model 2311, performance model 2312, and/or LCC model 2313, ambient condition 231, market condition 232, and/or process condition 233, as well as any additional information that might be suitable and/or desired. Such factors may be gathered into terms of an objective function, so that, for example, a LCC-based objective function might be stated as $$J = \sum_{t=1}^{ServiceLife} (C_{maintenance}(t) + C_{operation}(t)),$$

where $C_{maintenance}(t)$ represents maintenance cost over time t, $C_{operation}(t)$ represents operation cost over time t, and t varies from 1 to the prediction horizon (estimated service life in this example). This is a relatively simple example of an objective function, and a more complex objective function and/or optimization problem may be used in implementations of embodiments. However, both maintenance cost and operation cost may be functions of the various factors listed above and thus may be more comprehensive than the appearance of the example objective function might suggest.

Maintenance cost, for example, may be determined by modeling parts of power plant 130 to estimate wear based on various parameters, such as those listed above, which parts could include every part of power plant 130 down to nuts and bolts, in an extreme example. In a practical application, however, fewer, larger portions, or fewer, select portions of power plant 130 might be modeled, or constants might be used for some parts instead of modeling. Whatever level of detail might be employed, minimization of such an LCC-based objective function is part of an optimization problem that may vary for a given power plant as a result of many factors, such as those listed above, and may provide at least one enhanced or augmented operating parameter of power plant 130, such as in accordance with minimizing LCC. In addition, those skilled in the art will recognize that at least one constraint may be imposed upon the optimization problem, such as a predefined up time and/or down time, a predefined upper and/or lower temperature at various locations in power plant 130, a predefined torque, a predefined power output, and/or other constraints as may be desired and/or appropriate. It is within the purview of those skilled in the art to determine what constraints should be applied and in what manner for a given optimization problem. Further, those skilled in the art will recognize situations in which additional optimization theory techniques may be applied, such as adding a slack variable to allow a feasible solution to the optimization problem.

Known techniques may be employed, such as by enhancement module 2314 (FIG. 2), to solve an optimization problem for operation of power plant 130. For example, an integer programming, a linear, a mixed integer linear, a mixed integer nonlinear, and/or another technique may be used as may be suitable and/or desired. In addition, as seen in the example objective function, the optimization problem may be solved over a prediction horizon, providing an array of values for at least one parameter of power plant 130. While enhancement or augmentation may be performed over a relatively short prediction horizon, such as 24 hours or even on the order of minutes, enhancement module 2314 (FIG. 2) may employ a longer prediction horizon, such as up to an estimated service life of power plant 130, depending on a depth of analysis desired. In embodiments, the initial set point determined, such as by controls model 2311 (FIG. 2), may be adjusted responsive to and/or as part of the solution of the optimization problem to yield an enhanced or augmented set point. In addition, iteration may be used with determining an initial set point, determining a value of a performance indicator, determining an estimated LCC cost, and enhancing or augmenting (blocks 2014-2020 of FIG. 2) to refine results and/or better enhance or augment control settings of power plant 130.

Figure 4:
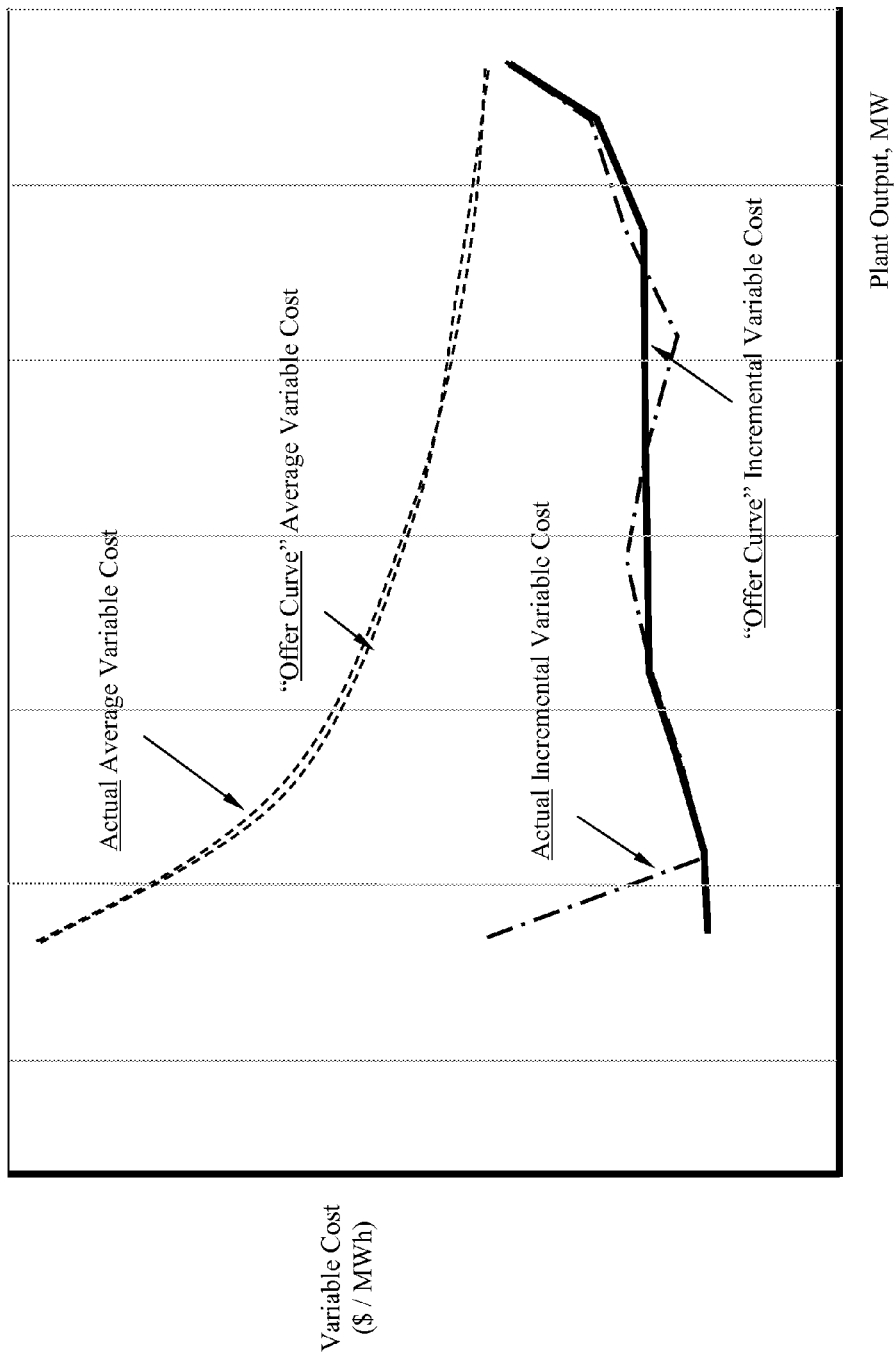
FIG. 4 shows an example of a set of offer curves according to embodiments of the invention disclosed herein.

As will be described, an offer curve production portion 2030 may generate an offer curve or set of offer curves 2325, an example of which is shown in FIG. 4. Information from main control portion 2010, such as main control information 2315, may be received (block 2032) and may include, for example, control settings/set point(s), performance, ambient conditions, and/or market conditions, which may be "as run" information. In addition, an ambient condition forecast 2321 and/or market condition forecast 2322 may be received (block 2034). A database 2323 may be included and may store current information, "as run" information, and/or historical information, including any or all of ambient conditions, market conditions, power plant performance information, offer curves, control settings/set points, and/or any other information which may be suitable and/or desirable. In particular, database 2323 may be used to provide information to simulate operation of power plant 130 (block 2036), such as with an offline model 2324 of power plant 130.

Offline model 2324 may include a model similar to controls model 2311, but may also include additional modeling information. For example, offline model 2324 may incorporate portions or entireties of controls model 2311, performance model 2312, LCC model 2313, and/or additional modeling information. By running offline model 2314 with settings and/or information from enhancing or augmenting LCC, output of offline model 2324 may be used to determine estimated values for cost of power production for each time interval in a prediction horizon and for various values of power output of power plant 130 to generate one or more offer curves 2325 (block 2038) which may be sent or otherwise provided to power plant system controller 210 (block 2040). Offline model 2324 may use any suitable information, such as historical, current, and/or forecast information, in determining estimated operating costs and/or conditions of power plant 130. In addition, offline model 2324 in embodiments may be tuned (block 2042), such as by a model tuning module 2326. Tuning may include, for example, periodically adjusting parameters for offline model 2324 based on information received and/or provided by other parts of power plant control system 230 to better reflect actual operation of power plant 130 so as to better simulate operation of power plant 130. Thus, for a given set of operating parameters, if power plant controller 230 observes an actual process condition that differs from what offline model 2324 had predicted, power plant controller 230 may change offline model 2324 accordingly.

In addition to offer curves 2325, power system controller 210 may receive offer curves 213 from other power plants under its control. Power system controller 210 may assess the offer curves 213, 2325 and may generate a dispatch schedule to accommodate a load on power system 100. Power system controller 210 may additionally take into account forecasted ambient conditions 214, a load forecast 215 and/or other information as may be appropriate and/or desired. The dispatch schedule produced by power system controller 210 may include a control signal for power plant 130 and may include a new target load, to which power plant control system 230 may respond as described above.

With the introduction of LCC-based operation enhancement or augmentation into power plant operation, accuracy of models used in power plant control system 230 might be affected. As a check of model accuracy, actual cost curves were compared to an example of offer curves 2325 generated by embodiments, as shown in FIG. 3. Offer curves 2325, as described above, may represent variable cost, measured in dollars per megawatt-hour versus power plant output in megawatts. Offer curves 2325 may include an incremental variable cost offer curve and an average variable cost offer curve, which are shown in FIG. 3 with actual incremental and average variable cost curves. As can be seen, embodiments provide reasonably accurate assessments of variable cost via offer curves 2325, since the incremental variable cost offer curve was close to the actual incremental variable cost curve, and the average variable cost offer curve was very close to the actual average variable cost curve. The accuracy of the offer curves generated by embodiments may indicate that the various models used in power plant control system 230 suitably represent power plant 130, and that embodiments may therefore be relied upon to optimize LCC of power plant 130.

Figure 5:
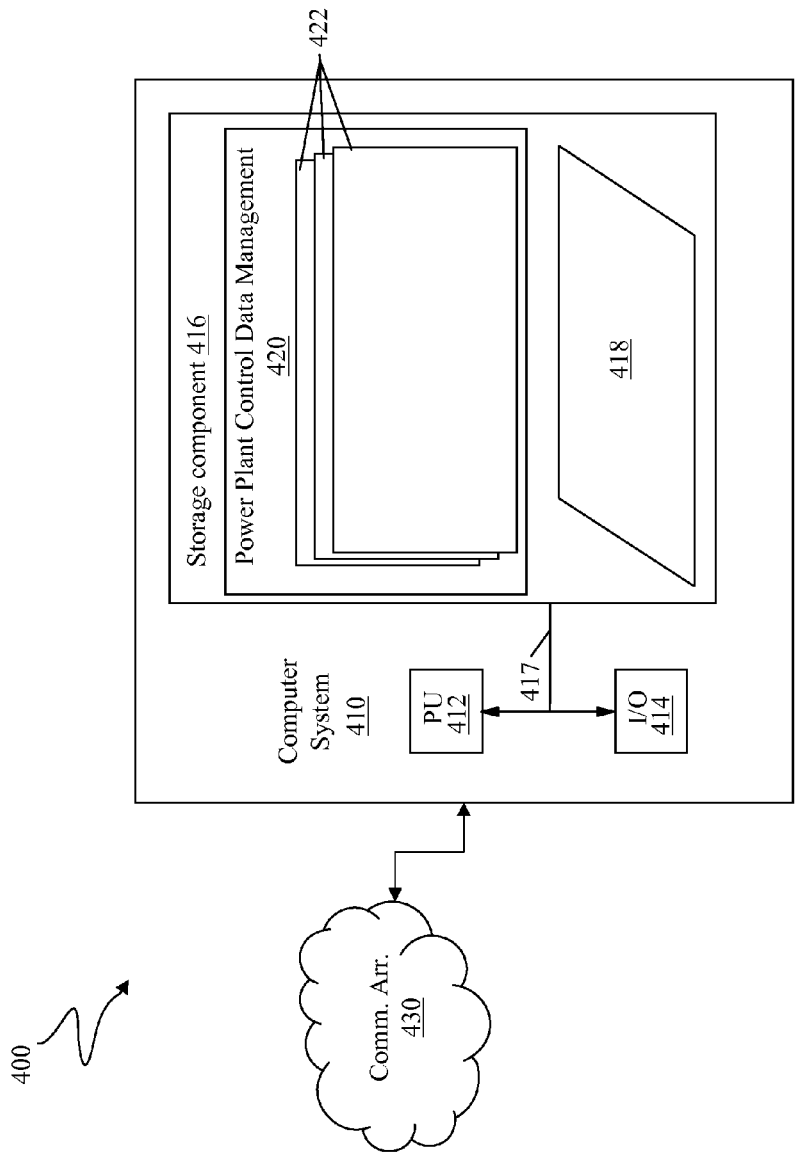
FIG. 5 shows a schematic block diagram of a computing environment for implementing power plant control according to embodiments of the invention disclosed herein.

Turning to FIG. 5, an illustrative environment 400 for a power plant control computer program product is schematically illustrated according to an embodiment of the invention. To this extent, environment 400 includes a computer system 410, such as a power plant control system 230 or other computing device that may be part of a power plant that may perform a process described herein in order to execute an automatic power plant control method according to embodiments. In particular, computer system 410 is shown including a power plant control program 420, which makes computer system 410 operable to manage data in a power plant controller or control system by performing a process described herein, such as an embodiment of the power plant control method discussed above.

Computer system 410 is shown including a processing component or unit (PU) 412 (e.g., one or more processors), an input/output (I/O) component 414 (e.g., one or more I/O interfaces and/or devices), a storage component 416 (e.g., a storage hierarchy), and a communications pathway 417. In general, processing component 412 executes program code, such as power plant control program 420, which is at least partially fixed in storage component 416, which may include one or more computer readable storage medium or device. While executing program code, processing component 412 may process data, which may result in reading and/or writing transformed data from/to storage component 416 and/or I/O component 414 for further processing. Pathway 417 provides a communications link between each of the components in computer system 410. I/O component 414 may comprise one or more human I/O devices, which enable a human user to interact with computer system 410 and/or one or more communications devices to enable a system user to communicate with computer system 410 using any type of communications link. In embodiments, a communications arrangement 430, such as networking hardware/software, enables computing device 410 to communicate with other devices in and outside of a node in which it is installed. To this extent, power plant control program 420 may manage a set of interfaces (e.g., graphical user interface(s), application program interface, and/or the like) that enable human and/or system users to interact with power plant control program 420. Further, power plant control program 420 may manage (e.g., store, retrieve, create, manipulate, organize, present, etc.) data, such as power plant control data 418, using any solution.

Computer system 410 may comprise one or more general purpose computing articles of manufacture (e.g., computing devices) capable of executing program code, such as power plant control program 420, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one non-transitory computer readable medium. It is understood that the term "non-transitory computer readable medium" may comprise one or more of any type of tangible medium of expression, now known or later developed, from which a copy of the program code may be perceived, reproduced, or otherwise communicated by a computing device. For example, the non-transitory computer readable medium may comprise: one or more portable storage articles of manufacture, including storage devices; one or more memory/storage components of a computing device; paper; and/or the like. Examples of memory/storage components and/or storage devices include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other tangible, non-transitory computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. A technical effect of the executable instructions is to implement a power plant control method and/or system and/or computer program product that uses models to enhance or augment an operating characteristic of a power plant to so that as much use may be had from the power plant as possible given target load, as well as ambient and/or market conditions, performance, and life cycle cost of the power plant. In addition to using current information, historical and/or forecast information may be employed, and a feedback loop may be established with a power system controller to achieve operation of the power system overall that is augmented for reduced LCC of the power plant.

The computer program code may be written in computer instructions executable by the controller, such as in the form of software encoded in any programming language. Examples of suitable computer instruction and/or programming languages include, but are not limited to, assembly language, Verilog, Verilog HDL (Verilog Hardware Description Language), Very High Speed IC Hardware Description Language (VHSIC HDL or VHDL), FORTRAN (Formula Translation), C, C++, C#, Java, ALGOL (Algorithmic Language), BASIC (Beginner All-Purpose Symbolic Instruction Code), APL (A Programming Language), ActiveX, Python, Perl, php, Tcl (Tool Command Language), HTML (HyperText Markup Language), XML (eXtensible Markup Language), and any combination or derivative of one or more of these and/or others now known and/or later developed and/or discovered. To this extent, power plant control program 420 may be embodied as any combination of system software and/or application software.

Further, power plant control program 420 may be implemented using a set of modules 422. In this case, a module 422 may enable computer system 410 to perform a set of tasks used by power plant control program 420, and may be separately developed and/or implemented apart from other portions of power plant control program 420. As used herein, the term "component" means any configuration of hardware, with or without software, which implements the functionality described in conjunction therewith using any solution, while the term "module" means program code that enables a computer system 410 to implement the actions described in conjunction therewith using any solution. When fixed in a storage component 416 of a computer system 410 that includes a processing component 412, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 410.

When computer system 410 comprises multiple computing devices, each computing device may have only a portion of power plant control program 420 fixed thereon (e.g., one or more modules 422). However, it is understood that computer system 410 and power plant control program 420 are only representative of various possible equivalent computer systems that may perform a process described herein. To this extent, in other embodiments, the functionality provided by computer system 410 and power plant control program 420 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 410 includes multiple computing devices, the computing devices may communicate over any type of communications link. Further, while performing a process described herein, computer system 410 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

As discussed herein, power plant control program 420 enables computer system 410 to implement a power plant control product and/or method, such as that shown schematically in FIG. 4. Computer system 410 may obtain power plant control data 418 using any solution. For example, computer system 410 may generate and/or be used to generate power plant control data 418, retrieve power plant control data 418 from one or more data stores, receive power plant control data 418 from another system or device in or outside of a power plant, power plant controller, power plant control system, and/or the like.

In another embodiment, the invention provides a method of providing a copy of program code, such as power plant control program 420 (FIG. 5), which implements some or all of a process described herein, such as that shown schematically in and described with reference to FIG. 4. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one tangible computer readable medium. In either case, the set of data signals may be transmitted/received using any type of communications link.

In still another embodiment, the invention provides a method of generating a system for implementing an automatic power plant control product and/or method. In this case, a computer system, such as computer system 410 (FIG. 5), can be obtained (e.g., created, maintained, made available, etc.), and one or more components for performing a process described herein can be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to implement a power plant control product and/or method as described herein. In this case, the service provider can manage (e.g., create, maintain, support, etc.) a computer system, such as computer system 410 (FIG. 5), that performs a process described herein for one or more customers. In return, the service provider can receive payment from the customer(s) under a subscription and/or fee agreement, receive payment from the sale of advertising to one or more third parties, and/or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A power plant life cycle cost enhancing system for a power plant comprising:
   a power plant arranged to generate electricity by burning fuel; and
   a power plant control system including a computing device operationally coupled to the power plant, the computing device being configured to:
   monitor a first parameter of the power plant;
   receive a target load representing a desired power output of the power plant;
   employ a first model of the power plant to simulate operation of the power plant and determine output of the first model including at least a performance indicator of the power plant, an initial set point for an operating parameter of the power plant, and an estimated life cycle cost of the power plant responsive to at least the monitored parameter of the power plant;
   augment the operating parameter using the output of the first model, wherein the augmenting is responsive to a life cycle cost based objective function such that the life cycle cost based objective function is solved for reduced life cycle cost, thereby producing an augmented set point for the operating parameter; and
   generate at least one offer curve including a cost of power production versus power output of the power plant using the augmented set point.

2. The system of claim 1, wherein the first model includes a controls model of the power plant configured to determine the initial set point based on at least a physical detail of the power plant responsive to the target load.

3. The system of claim 2, wherein the power plant includes a gas turbine and the initial set point is for a firing temperature of the power plant.

4. The system of claim 1, wherein the first model includes a performance model of the power plant configured to determine a value of a performance indicator responsive to the monitored parameter of the power plant and based on at least a physical detail of the power plant.

5. The system of claim 4, wherein the performance indicator is an efficiency of the power plant.

6. The system of claim 1, wherein the first model includes a life cycle cost model of the power plant configured to determine the estimated life cycle cost of the power plant based on at least cost information about the power plant.

7. The system of claim 6, wherein the cost information includes maintenance cost information.

8. The system of claim 1, wherein the computing device is further configured to iterate employing the first model and augmenting by employing the first model with output of the augmenting.

9. A computer program product for enabling enhanced offer curve generation of a power plant by a power plant control system, the power plant control system including a computing device and a non-transitory storage device arranged to store the computer program product, the computing device being configured to execute the computer program product, and the computer program product comprising instructions in the form of computer executable program code that when executed configures the power plant control system to: generate an offer curve of the power plant, the offer curve representing an estimated cost of operation versus power output of the power plant, in response to an augmented value of an operating parameter of the power plant wherein the augmented value is based at least in part on a life cycle cost based objective function for the power plant, the life cycle cost based objective function being responsive to at least a life cycle cost model of the power plant and an initial set point of the operating parameter.

10. The computer program product of claim 9, wherein the power plant includes a thermal generator.

11. The computer program product of claim 9, wherein the instructions further configure the power plant control system to provide a controls model of the power plant, the controls model being configured to determine the initial set point of the operating parameter.

12. The computer program product of claim 11, wherein the power plant is part of a power system, and the controls model is configured to determine the initial set point responsive to a target load received from a power system controller.

13. The computer program product of claim 9, wherein the instructions further configure the power plant control system to augment the operating parameter responsive to a performance model of the power plant configured to determine a value of a performance characteristic of the power plant.

14. The computer program product of claim 9, wherein the instructions further configure the power plant control system to simulate operation of the power plant with an offline model over a predefined prediction horizon, and wherein the offer curve is based at least in part on output of the offline model.

15. The computer program product of claim 14, wherein the instructions further configure the power plant control system to adjust the offline model responsive to observed information.

16. The computer program product of claim 14, wherein the offline model is further configured to be responsive to the augmented value of the operating parameter.

17. The computer program product of claim 14, wherein the offline model is configured to be responsive to information received from a database including information from at least a startup of the power plant to a current operation of the power plant.

18. The computer program product of claim 17, wherein the database includes information from at least an earliest startup of the power plant to a current operation of the power plant.

19. The computer program product of claim 14, wherein the offline model is configured to be responsive to at least one of an ambient conditions forecast or a market forecast.

* * * * *